Oct. 28, 1969  G. J. O'ROURKE  3,475,064
FLEXIBLE BELT ADAPTED TO SUPPORT HEAVY LOADS
Filed June 9, 1967  2 Sheets-Sheet 1
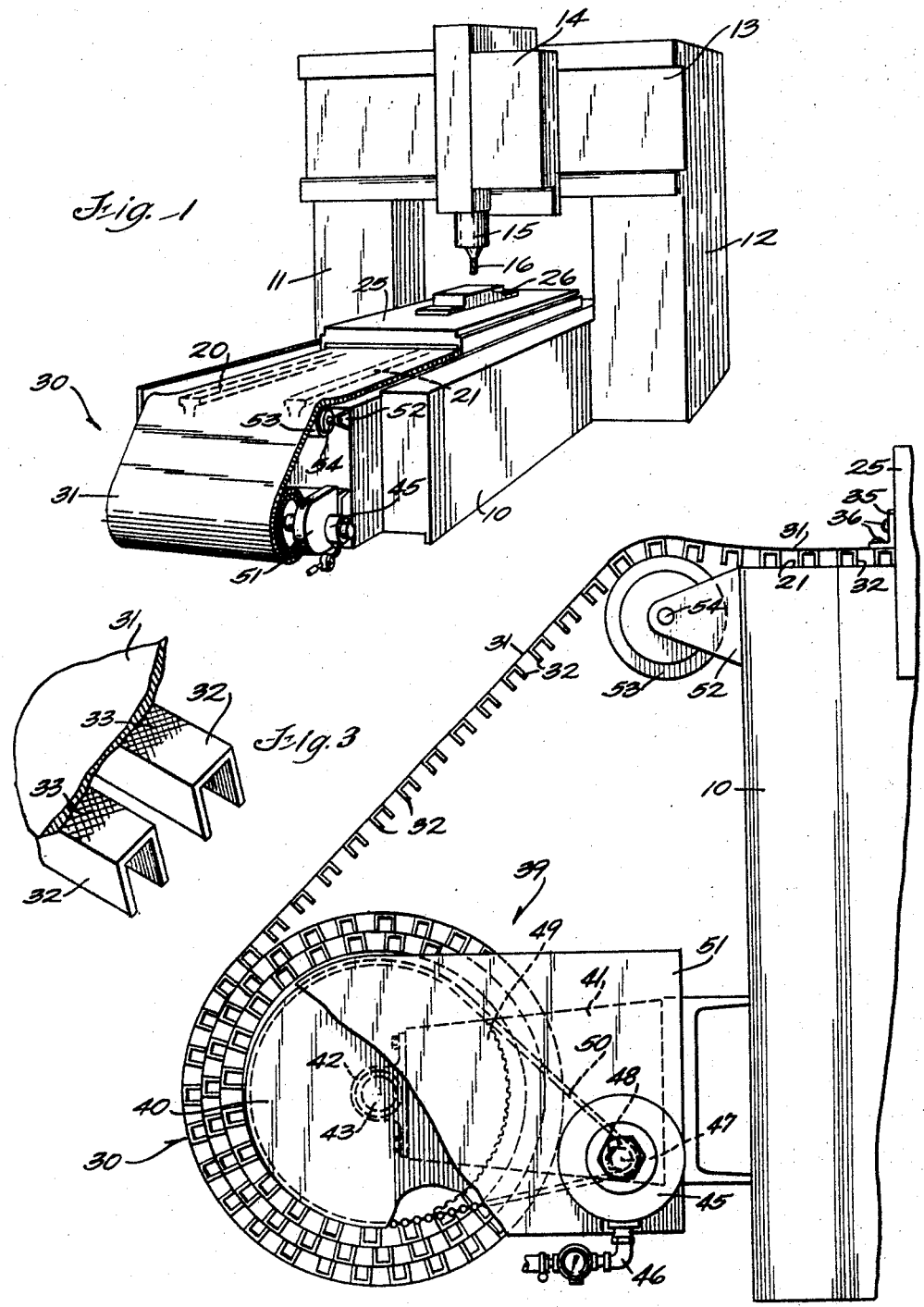

United States Patent Office 3,475,064
Patented Oct. 28, 1969

3,475,064
FLEXIBLE BELT ADAPTED TO SUPPORT HEAVY LOADS
Gerald J. O'Rourke, 2620 Anita Drive, Brookfield, Wis. 53005
Filed June 9, 1967, Ser. No. 644,915
Int. Cl. F16c 17/00, 21/00, 29/00
U.S. Cl. 308—3.5                                    8 Claims

ABSTRACT OF THE DISCLOSURE

A flexible belt capable of supporting substantial loads formed of one or more strips of flexible sheet material having reinforcing bars extending across its width at intervals. The reinforcing bars slide along the surfaces which support the belt for sliding movement and carry the strip of flexible material directly above such surfaces. The strip of flexible material with its reinforcing bars retain sufficient flexibility to enable the belt to roll into a cylindrical shape and yet the reinforcing bars impart sufficient strength to enable the belt to span a space and still support a man walking on top of it.

BACKGROUND OF THE INVENTION

The flexible belt of the present invention may be employed in different applications, as for example as a conveyor belt or as a way cover for machine tools. It will be described herein in connection with its use as a way cover for machine tools.

Machine tool way surfaces support a movable member of a machine tool for sliding movement along the surfaces of the ways. The movable member is provided with bearing surfaces which engage the bearing surfaces of the ways and slide along the way surfaces. As the movable member slides along the way surfaces, different portions of the way surfaces become exposed and machining chips as well as other debris fall upon the surfaces. Wipers have been provided on the movable members to wipe away the chips and debris immediately before being engaged by the bearings of the movable member, but these are not completely satisfactory. Such wipers wear rapidly and chips get caught underneath them. When this occurs, the chip is moved back and forth with the movable member until the way surface is gouged and further damage results. The difficulty is especially prevalent on horizontal ways where the way surfaces become fully exposed to falling chips produced by the machine during its operation.

In order to remedy this deficiency it has become the practice to provide way covers, particularly for the larger machine tools where the way surfaces are subjected to severe usage. Initially, telescoping way covers were provided in which the covers extended from each end of the movable member with the opposite end of each cover being secured to one extremity of the way surfaces. As the machine tool member moves, one of the two telescoping way covers is extended while the other is being compressed. However, they keep the way surfaces covered at all times to protect them from chips and dirt.

The way surfaces that are being protected are two parallel strips of bearing surfaces, and in larger machine tools the two parallel way surfaces are an appreciable distance apart so that the way covers span a substantial distance. In addition it has been found convenient to have these way covers support a man while he is servicing the machine. It is impractical to build telescoping way surfaces of sufficient strength to meet these demands. Accordingly, a way cover was developed that is formed of reinforced extruded panels or strips that are interlocked with each other and adapted to be compactly rolled up at both ends of the machine. Such a way cover is illustrated in Patent 2,850,332 issued to Begle. It is sufficiently strong to support a man walking on it even over relatively large spans. However, a difficulty with this type of way cover lies in the fact that there is a joint between each of the strips and this joint opens up as the cover rolls around a cover or onto its storage cylinder. Chips and dirt may lodge in these joints and cause problems which are a nuisance. The improved flexible belt of the present invention may be employed as a machine tool way cover that presents a top surface without any openings to avoid any possibility of chips lodging in a joint. It is reinforced so that it will support a man walking on it and yet can be compactly rolled up at the ends of the way surfaces to take up the cover as the machine tool member moves along the way surfaces.

SUMMARY OF THE INVENTION

The improved flexible belt of the present invention comprises one or more strips of flexible sheet material such as stainless steel sheet. This sheet may be continuous through the entire length of the way cover or it may be a plurality of strips with their ends abutting and secured together in such a manner so that their junctures do not present openings at any time during their operation. Reinforcing bars are secured to the back side of the sheet steel to extend across its entire width at frequent intervals along its length for the purpose of reinforcing the sheet steel. When the flexible belt of the present invention serves as a machine tool way cover its reinforcing bars span the parallel way surfaces of the machine tool and ride along the way surfaces while supporting the sheet steel directly above the way surfaces to protect the latter. These reinforcing bars impart sufficient strength to the way cover to enable a man to walk on it while it overlies the way surfaces of the machine tool.

The reinforcing bars are small enough to permit the way cover to be compactly rolled at the end of the way surfaces when the machine tool member is moved to that end of the way surfaces. The take up roll for receiving the way cover at the end of the way surfaces is of cylindrical configuration. One end of the way cover is secured to the take up roll while the other end of the way cover is fastened to the movable member. The take up roll is connected to be rotated by an air motor that applies a constant biasing torque to the roll for auomatically taking up the slack in the way cover when the movable member moves toward the take up roll. On the other hand, when the movable member moves away from the take up roll the movable member take the way cover with it off of the take up roll against the force applied by the air motor which is not sufficient to interfere with any of the normal machine tool movements.

DESCRIPTION OF THE DRAWING

The foregoing and other objects of this invention, which will become more fully apparent from the following detailed description of an embodiment thereof may be achieved by the apparatus herein described by way of example in connection with the illustration of its structural components in the accompanying drawings; in which:

FIGURE 1 is a perspective view of a machine tool showing the flexible belt of the present invention utilized as way covers for protecting the way surfaces of the machine tool;

FIGURE 2 is a fragmentary side elevational view of the machine tool shown in FIGURE 1, illustrating the way cover and its take up roll along with the supporting and operating mechanism for the take up roll;

FIGURE 3 is an enlarged detail view of a portion of the way cover depicting its reinforcing bars secured to the underside of the continuous protective sheet;

DESCRIPTION OF TWO PREFERRED EMBODIMENTS

Figure 4:
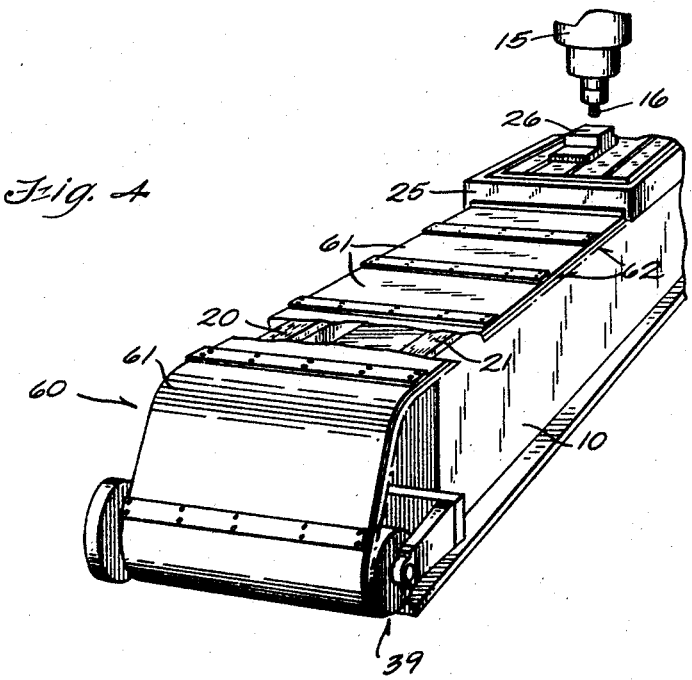
FIGURE 4 is a perspective view of the machine tool illustrated in FIGURE 1 except that the flexible belt serving as a way cover is formed of a plurality of strips of flexible material joined together instead of a single continuous strip.

Reference is now made more particularly to the drawings and specifically to FIGURE 1 which illustrates a machine tool equipped with a way cover constructed in accordance with the teachings of the present invention. As there shown, the machine comprises a stationary bed 10 having a pair of upstanding columns 11 and 12 fixed with respect to the bed 10 with the column 11 being disposed on one side of the bed 10 and the column 12 on the opposite side of the bed. A rail 13 spans the upper portion of the two columns 11 and 12 and is mounted to the front faces of the columns.

The rail 13 supports a spindle head 14 for horizontal movement along the length of the rail 13. A spindle 15 is journalled in the spindle head 14 and is connected to a suitable source of power in well know maner to be rotated thereby for driving a cutter 16 in a work operation. A pair of spaced parallel ways 20 and 21 extend longitudinally along the top of the bed 10 for receiving cooperating bearing surfaces (not shown) formed on the underside of a work supporting table 25. The bearing surfaces (not shown) of the table 25 slide along the top surfaces of the ways 20 and 21 to support the table 25 for longitudinal movement in a horizontal path along the top of the bed 10. Suitable power means (not shown) are provided for actuating the table 25 in its path of travel in well known manner. A work piece 26 to be machined is mounted on top of the table 25 and the combined movements of the table 25 and the spindle 15 cooperate to produce relative movement between the cutter 16 and the work piece 26 for completing a machining operation on the workpiece.

It is apparent that if suitable protection were not provided the way surfaces 20 and 21 would be partially exposed as the table 25 moves back and forth along the bed 10. Such exposure of the way surfaces 20 and 21 is extremely undesirable inasmuch as the cutter 16 is producing chips when machining the workpiece and these chips would fall upon the way surfaces 20 and 21. Possible serious damage may result if such chips should be caught by the table 25 and dragged along the finely machined way surfaces 20 and 21. Such damage is avoided by providing the way covers generally identified by the reference numeral 30 for continuously protecting the way surfaces 20 and 21 from the chips and other debris that may fall in their direction. One such way cover is illustrated in FIGURE 1 on the front portion of the machine but it should be understood that in the particular application illustrated, another identical way cover 30 must be provided on the opposite end of the bed 10 for protecting the way surfaces 20 and 21 on the other side of the table 25.

The flexible belt forming the way cover 30 comprises a sheet 31 of flexible material reinforced by bars or channels 32 that extend across the complete width of the sheet 31 and are disposed on the back side of the sheet 31 at frequent intervals with a plurality of the bars 32 being disposed in parallel relationship along the length of the sheet 31. Although the sheet 31 is not limited to any particular material it has been found that a stainless steel sheet approximately .008 inch in thickness is ideally suited for the way cover of the present invention. Moreover, the reinforcing bars 32 may likewise be fabricated of different materials in a variety of configurations but it has also been found that if they are one-half inch by one-half inch aluminum structural channels or angles with a one-half inch spacing between each bar, they will cooperate with the .008 inch thick stainless sheet steel to produce an excellent way cover. Likewise, different means may be employed for securing the bars 32 to the underside of the sheet 31 for forming the way cover 30 but an economical and very efficient means is to employ an adhesive 33 for securing the flat top surfaces of the bars 32 to the underside of the sheet steel 31. Such bonding of the bars 32 to the back of the sheet steel 31 may be achieved by a nitrile rubber base bonding film having a fiber glass mat. This adhesive has been employed in conjunction with the aluminum channels 32 and stainless steel sheet metal 31 and has been found to function very satisfactorily although pressure and temperature sensitive adhesives are available for this purpose.

The edges of the legs of the channels 32 engage the way surfaces 20 and 21 and support the sheet 31 directly above the way surfaces. The bars 32 span the entire width of the machine across the way surfaces 20 and 21, including the width of the way surfaces themselves. The sheet material 31 presents an absolutely smooth surface without any joints or openings for reception of the chips and debris that may fall thereupon. Moreover, the reinforcing bars 32 impart great strength to the way cover 30 so that when the way cover overlies the ways 20 and 21, a man can walk on the way cover 30 for servicing the head 14, the rail 13 or the spindle 15 as well as other parts that are disposed at substantial height, and the way cover 30 will support the man without being subjected to excessive strain.

As clearly shown in FIGURE 2, one end of the way cover 30 is secured to the end edge of the table 25 by an angle 35 which extends across the entire width of the way cover 30 and is secured to the way cover 30 and the table 25 by screws 36. The opposite end of the way cover 30 is secured to a take-up mechanism generally identified by the reference numeral 39. The take-up mechanism 39 comprises a cylinder 40 that is rotatably supported at the end of the bed 10. As illustrated in FIGURE 2, the cylinder 40 is carried by a bracket 41 which extends outwardly from the bottom end of the bed 10. A pillow block bearing 42 is mounted on the extending end of the bracket 41 and a shaft 43 extending from the cylinder 40 is journalled in the bearing 42. The shaft 43 is an integral part of the cylinder 40 so that the cylinder and its cooperating shaft 43 rotate in unison. An identical bracket 41 and bearing 42 are provided on the opposite side of the bed 10 for rotatably supporting the opposite end of the shaft 43 which extends outwardly from the opposite end of the cylinder 40 as well.

It is important to continuously apply a tension to the way cover 30 to retain it taut and cause it to automatically roll upon the cylinder 40 when the table 25 is moved toward the front end of the bed 10. To this end, the take-up mechanism 39 includes an air motor 45 carried by the bracket 41 and supplied by air through a conduit 46 that is connected to a suitable source of pneumatic pressure. The motor 45 presents a drive shaft 47 having a small sprocket 48 keyed to it. The cylinder 40 is provided with a large sprocket 49 that is keyed to the shaft 43 for rotation with the shaft and its associated cylinder 40. A roller chain 50 is in meshing engagement with the sprockets 48 and 49 for transmitting the power from the motor 45 to the cylinder 40. The motor 45 acts as a pneumatic spring that resiliently applies a constant torque to the cylinder 40 tending to roll the way cover 30 onto the cylinder. A guard 51 is carried by the bracket 41 to cover the sprockets 48 and 49 and their cooperating chain 50.

At the upper end of the bed end there is provided a bracket 52 with an identical bracket 52 (not shown)

being mounted on the opposite side of the bed 10 in cooperating relationship. A roller 53 is provided with a shaft 54 extending from both ends of the roller with the two extending ends of the shaft 54 being journalled in the two brackets 52 for rotatably supporting the roller 53. The way cover 30 rides over the roller 53 as the way cover is being withdrawn from and retracted toward the cylinder 40. It will be noted that the upper periphery of the roller 53 is higher than the way surfaces 20 and 21 so that the bars 32 clear the edge of the bed 10 when they are being drawn onto the way surfaces 20 and 21.

The pneumatic motor 45 applies a continuous biasing torque to the cylinder 40 for maintaining a tension on the way guard 30. Assuming, that the take-up mechanism 39 is mounted at the front end of the bed 10, when the table 25 moves toward the rear end of the bed 10 it will draw the way guard with it over the way surfaces 20 and 21 and the way guard 30 will be reeled off of the cylinder 40 against the force applied by the air motor 45. Thus, although the table 25 is moving toward the rear end of the bed 10, the way surfaces 20 and 21 will continue to be covered by the way cover 30. When the table 25 is moving in the opposite direction toward the front end of the bed 10, the torque applied to the cylinder 40 by the air motor 45 will be sufficient to maintain a tension on the way cover 30 and reel the excess portion of the way cover 30 onto the cylinder 40. The way cover 30 will therefore roll off of the way surfaces 20 and 21 over the roller 53 and downwardly onto the cylinder 40 into a compact roll for storage so that a neat appearance is always maintained.

Although the reinforcing bars 32 are of relatively small size they are spaced close enough together to provide more than enough strength for supporting a man walking on top of the way cover 30. The relatively small dimensions of the bars 32 in combination with the flexible sheet steel 31 render a great amount of flexibility to the way cover 30 so that it may be rolled into the compact roll illustrated in FIGURE 2 without any difficulty.

The improved way cover has been described above and illustrated in FIGS. 1, 2 and 3 as being formed of a continuous sheet 31 so that the entire way cover 30 is formed without a joint. Such construction may be inconvenient for fabricating way covers 30 to accommodate different machines and may present a storage problem for storing way covers 30 of the required lengths to equip a variety of machines. Accordingly, it may be far more convenient to construct the improved way cover of the present invention in standard lengths, such as for example, lengths of two feet, and joining these lengths together by suitable junctures that will retain the flexibility of the way cover but which will not present any openings or gaps in which chips may be caught.

Figure 5:
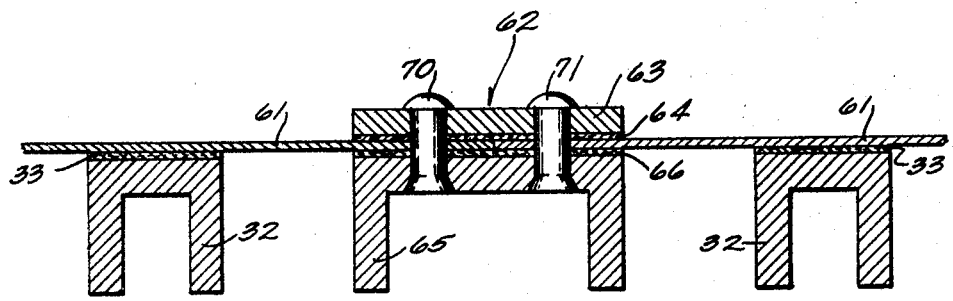
FIGURE 5 is a greatly enlarged cross sectional view taken through one of the junctures that unite two strips of the flexible material in the way cover shown in FIGURE 4.

Such modified way cover is illustrated in FIGS. 4 and 5 and is generally identified by the reference numeral 60. As there shown, the way cover 60 is formed of separate lengths 61 of flexible sheet material such as stainless steel. These lengths 61 may be of a standard dimension, such as two feet long, and each length 61 is joined to its adjacent length by a joint generally identified by the reference numeral 62. Thus, the fabrication of the way covers 60 becomes a simple matter wherein the fabricator will take the required number of lengths 61 to accommodate the particular machine to which the way cover 60 is to be applied and will join these several lengths by the required number of joints 62. Each of the lengths 61 is reinforced by the parallel structural members or bars 32 in the same manner as described above for the continuous sheet 31 of the way cover 30 illustrated in FIGS. 1, 2 and 3.

A joint 62 is illustrated in FIG. 5 wherein the several parts are illustrated greatly enlarged for the purpose of clarity. As there shown, each joint 62 comprises the adjoining ends of adjacent lengths 61 abutting each other with a stainless steel plate 63 overlying the abutting ends across the entire width of the way cover 60. A portion of the plate 63 overlaps onto both lengths 61. A layer of adhesive 64 is interposed between the plate 63 and the underlying surfaces of the two lengths 61.

Further strength is imparted to the joint 62 by a structural member 65 of substantially the same width as the plate 63 and in alignment with the plate 63 on the opposite side of the two lengths 61. The structural member 65 likewise extends across the entire width of the way cover 60 and presents a smooth unbroken surface adjacent to the under surface of the two lengths 61 with only a layer of adhesive 66 sandwiched between the top unbroken surface of the structural member 65 and the undersurface of the two adjoining lengths 61.

To firmly unite the two lengths 61, a row of rivets 70 is provided on one side of the abutting ends of the two lengths 61 and another row of rivets 71 is provided on the other side of the abutting ends. The rivets 70 and 71 extend through the plate 63, the associated lengths 61, and the structural member 65 for joining the two lengths 61 together. It has been found that if the lengths 61 are formed of stainless steel .008 inch in thickness, the plate 63 may be formed of stainless steel .028 inch in thickness to provide strength to the joint while not detracting from the flexibility of the way cover 60 as a unit.

The structural member 65 has been illustrated as being twice the width of the reinforcing bars 32 so that it comprises a one-half inch by one inch channel although it should be understood that other forms of reinforcing bars may be employed in the joint 62. The illustrated channel member functions very satisfactory inasmuch as it provides an excellent crossbar section for imparting strength to the joint 62 and moreover includes two legs which serve very well to support the lengths 61 of sheet material above the surface of the ways 20 and 21.

From the foregoing detailed description of the structure and operation of the illustrative embodiment of the present invention, it will be apparent that a new and improved flexible belt has been provided which provides a smooth top surface so that dirt and debris cannot be caught in it. The flexible belt is ideal for use as a machine tool way cover and is adequately reinforced to support a man walking upon it when it is overlying the machine tool way surfaces. Such cover can be rolled into a compact roll for storage purposes when it is moved off of the way surface in response to the movement of the movable machine tool member.

Although the illustrative embodiments of the present invention have been described in considerable detail for the purpose of making a full disclosure of a practical operative arrangement by means of which the invention may be practiced, it is to be understood that various novel features of the invention may be incorporated in other arrangements without departing from the spirit and scope of the invention as defined in the subjoined claims.

The principles of the invention having now been fully explained in connection with the foregoing description of embodying structures, I hereby claim as my invention:

1. In a machine tool having a frame; way surfaces mounted on said frame; a movable member slidably supported on said way surfaces; a sheet of flexible material extending along the length of said way surfaces with its width spanning the space between the way surfaces as well as covering the way surfaces; a plurality of reinforcing means extending substantially across the width of said sheet and being secured to the underside of said sheet in spaced relationship to each other to engage said way surfaces for sliding movement along said way surfaces and carrying said sheet directly above such way surfaces for protecting the latter from falling chips and debris; and means securing one end of said sheet to said movable member so that said sheet will move along said way surfaces with the movement of the movable member with said reinforcing means sliding along said way surfaces for supporting said sheet directly above said way surfaces.

2. A machine tool according to claim 1 wherein the first end of said sheet is attached to the movable member; and including take-up means at an end of the way surfaces for receiving the second end of said sheet and progressively taking up the excess portion of said sheet as the movable member moves toward said take-up means, while releasing said sheet for extension over the way surfaces as the movable member moves away from said take-up means.

3. A machine tool according to claim 2 wherein said take-up means comprises a rotary cylinder having the second end of said sheet secured to it so that as said cylinder rotates in a first direction said sheet will be rolled about said cylinder, and as said cylinder rotates in the opposite direction said sheet will be released for extension over the way surfaces; and biasing means continually urging said cylinder to rotate in the first direction for rolling said sheet onto said cylinder but yieldable in response to the movement of the movable member away from said take-up means for releasing said sheet from said cylinder.

4. A machine tool according to claim 3 wherein said biasing means comprises a pneumatic motor drivingly connected to said cylinder for continually urging said cylinder to rotate in the first direction for taking up said sheet.

5. A machine tool according to claim 1 wherein said sheet is formed of steel.

6. A machine tool according to claim 1 wherein said sheet of flexible material is formed of a plurality of separate sheets; and including joining means securing the separate sheets together in end to end relationship without any gap between the separate sheets so that the joined sheets present an unbroken surface.

7. A machine tool according to claim 2 wherein said sheet of flexible material is formed of a plurality of separate sheets; and including joining means securing the separate sheets together in end to end relationship without any gap between the separate sheets so that the joined sheets present an unbroken surface.

8. A machine tool according to claim 7 wherein said joining means comprises a plate for each pair of adjacent end portions of two adjoining separate sheets; and securing means securing said plate to the adjacent end portions of both of the adjoining sheets.

References Cited

UNITED STATES PATENTS

| | | | |
|---|---|---|---|
| 2,551,860 | 5/1951 | Welte | 308—3.5 |
| 2,850,332 | 9/1958 | Begle | 308—3.5 |
| 3,174,618 | 3/1965 | Wesson | 198—195 |
| 3,310,161 | 3/1967 | Kraft | 198—193 |

FOREIGN PATENTS

| | | |
|---|---|---|
| 442,222 | 1/1936 | Great Britain. |
| 663,106 | 12/1951 | Great Britain. |
| 34,140 | 2/1965 | Finland. |

RICHARD E. AEGERTER, Primary Examiner